(12) United States Patent
Binder et al.

(10) Patent No.: US 7,789,456 B2
(45) Date of Patent: Sep. 7, 2010

(54) COVERING ON AN OUTER PART OF A VEHICLE, RELATED PRODUCTION METHOD AND USE THEREOF

(75) Inventors: Hans Binder, Böhmenkirch (DE); Ottmar Binder, Böhmenkirch (DE)

(73) Assignee: Suddeutsche Aluminium Manufaktur GmbH, Bohmenkirch (DE)

( * ) Notice: Subject to any disclaimer, the term of this patent is extended or adjusted under 35 U.S.C. 154(b) by 179 days.

(21) Appl. No.: 11/887,702

(22) PCT Filed: Mar. 17, 2006

(86) PCT No.: PCT/EP2006/002452

§ 371 (c)(1),
(2), (4) Date: Oct. 2, 2007

(87) PCT Pub. No.: WO2006/125487

PCT Pub. Date: Nov. 30, 2006

(65) Prior Publication Data

US 2009/0045651 A1 Feb. 19, 2009

(30) Foreign Application Priority Data

Apr. 12, 2005 (DE) ............. 10 2005 017 744

(51) Int. Cl.
*B60R 13/04* (2006.01)
(52) U.S. Cl. ................................................. 296/191
(58) Field of Classification Search ............... 296/191
See application file for complete search history.

(56) References Cited

U.S. PATENT DOCUMENTS

| | | | | | |
|---|---|---|---|---|---|
| 3,439,950 | A | * | 4/1969 | Kunevicius | 293/128 |
| 3,451,709 | A | * | 6/1969 | Swauger | 293/128 |
| 3,472,546 | A | * | 10/1969 | Samuels | 293/128 |
| 3,572,798 | A | * | 3/1971 | Kunevicius | 293/128 |
| 3,572,799 | A | * | 3/1971 | Truesdell et al. | 293/128 |
| 4,300,116 | A | * | 11/1981 | Stahovec | 340/904 |
| 4,316,348 | A | * | 2/1982 | Adell | 49/462 |
| 4,334,700 | A | * | 6/1982 | Adell | 280/770 |
| 4,379,376 | A | * | 4/1983 | Adell | 49/462 |
| 4,379,377 | A | * | 4/1983 | Adell | 49/462 |
| 4,429,013 | A | * | 1/1984 | Adell | 428/122 |
| 4,444,818 | A | * | 4/1984 | Tominaga et al. | 428/34.5 |

(Continued)

FOREIGN PATENT DOCUMENTS

DE 488 650 1/1930

(Continued)

OTHER PUBLICATIONS

International Search Report for PCT/EP2006/002452, ISA/EP, mailed Jun. 28, 2006.

(Continued)

*Primary Examiner*—Kiran B. Patel
(74) *Attorney, Agent, or Firm*—Harness, Dickey & Pierce, P.L.C.

(57) ABSTRACT

The invention relates to a cover for an exterior motor vehicle part, particularly a motor vehicle door, comprising at least one carrier part and one cover part. It is provided that the cover part (20) is associated with a cover element, particularly a metal cover, overlaying the same.

14 Claims, 5 Drawing Sheets

U.S. PATENT DOCUMENTS

| | | | | |
|---|---|---|---|---|
| 4,457,112 | A * | 7/1984 | Adell | 49/462 |
| 4,581,807 | A * | 4/1986 | Adell | 29/527.4 |
| 4,792,180 | A * | 12/1988 | Jacobsen et al. | 296/210 |
| 4,961,605 | A * | 10/1990 | Cawthron et al. | 293/128 |
| 4,969,674 | A * | 11/1990 | Wagner | 293/128 |
| 5,041,472 | A * | 8/1991 | Myer | 523/219 |
| 5,060,994 | A * | 10/1991 | Martin et al. | 293/128 |
| 5,072,979 | A * | 12/1991 | Swinton | 293/128 |
| 5,322,722 | A * | 6/1994 | Rozenberg | 428/40.1 |
| 5,368,903 | A * | 11/1994 | Trier | 428/31 |
| 5,538,576 | A * | 7/1996 | Knop et al. | 156/229 |
| 5,730,446 | A * | 3/1998 | Taylor et al. | 277/312 |
| 5,846,631 | A * | 12/1998 | Nowosiadly | 428/99 |
| 6,030,030 | A * | 2/2000 | Riddle et al. | 296/209 |
| 6,139,089 | A * | 10/2000 | Troyer | 296/180.1 |
| 6,302,472 | B1 * | 10/2001 | Rahmstorf et al. | 296/146.5 |
| 6,435,602 | B1 * | 8/2002 | Sukegawa et al. | 296/191 |
| 6,527,319 | B1 * | 3/2003 | Martel | 293/128 |
| 6,880,960 | B2 * | 4/2005 | Mishimagi | 362/522 |
| 7,156,437 | B2 * | 1/2007 | Cowelchuk et al. | 296/1.08 |
| 7,517,001 | B1 * | 4/2009 | Goldbaum | 296/128 |
| 2005/0067856 | A1 * | 3/2005 | Leistra et al. | 296/146.6 |
| 2009/0045651 | A1 * | 2/2009 | Binder et al. | 296/191 |

FOREIGN PATENT DOCUMENTS

| | | |
|---|---|---|
| DE | 21 36 108 A | 2/1973 |
| DE | 28 52 387 A1 | 7/1979 |
| DE | 29 30 850 A1 | 2/1981 |
| DE | 197 14 242 A1 | 10/1998 |
| DE | 100 14 928 A1 | 12/2000 |
| DE | 100 29 544 A1 | 3/2002 |
| DE | 102 16 128 A1 | 11/2003 |
| EP | 0 865 965 A2 | 9/1998 |
| EP | 0 870 933 A2 | 10/1998 |
| EP | 0 870 933 B1 | 10/1998 |
| WO | 98/45604 | 10/1998 |

OTHER PUBLICATIONS

English translation of IPRP and annexes.
German Office Action for priority document DE 10 2005 017 744.1, dated Oct. 30, 2009.

* cited by examiner

COVERING ON AN OUTER PART OF A VEHICLE, RELATED PRODUCTION METHOD AND USE THEREOF

CROSS-REFERENCE TO RELATED APPLICATIONS

This application is a National Stage of International application No. PCT/EP2006/002452, filed 17 Mar., 2006. This application claims the benefit of DE 10 2005 017 744.1, filed 12 Apr., 2005. The disclosure(s) of the above applications are incorporated herein by reference.

The invention relates to a cover for an exterior motor vehicle part, particularly a motor vehicle door, comprising at least one carrier part and one cover part.

It is known to attach a cover to an exterior motor vehicle part, particularly a motor vehicle door, which in the case of the aforementioned motor vehicle door is disposed in the region of the lower edge of the door and extends across the entire door width. The cover part is configured in a strip shape and is located approximately in the plane of the outside of the remaining contour of the motor vehicle door. It is preferable if the metal of the motor vehicle door is offset toward the back in the region of the cover, wherein the zone offset toward the rear formed in this way serves to receive the carrier part and the cover part covering the carrier part. The cover part is configured as a plastic part, the outside thereof being painted in the color of the motor vehicle.

It is the object of the invention to create a cover of the type mentioned above, which enables a special design. In particular, the possibility of implementing different design variants without great complexity is to be created.

This object is achieved according to the invention in that the cover part is associated with a cover element overlaying the part, particularly a metal cover. According to the invention, the cover part originally serving as a cover means and held against the exterior motor vehicle part by means of the carrier part is overlaid by the cover element or metal cover, which accordingly forms a part of the cover that is visible from the outside and defines the design. The shape and surface configuration of the metal cover define the door design or the design in the region of the cover of the motor vehicle door, so that the metal cover crucially defines the appearance of the exterior motor vehicle part. Since in this respect the cover part, which due to being covered by the metal cover is no longer visible, according to the invention performs a supporting function for the metal cover and no new or additional parts are required, it is possible in a very simple manner, for example, to implement a vehicle series-specific variation. When in the context of this application a "metal cover" is mentioned, it can always also be a "cover element".

According to a further development of the invention, it is provided that the cover element or the metal cover braces or locks the cover part, which in this respect should be considered a carrier part, at least in an edge region and is glued to the cover part by means of at least one adhesive connection. By the brace or lock, a reproducible and secure position of the metal cover on the cover part is created. The cover part, by being overlaid by the metal cover, forms an inner cover part, which is not visible when viewing the outside of the door.

Furthermore, it is advantageous if the metal cover is a deep-drawn part. The metal cover may in particular be made of aluminum or an aluminum alloy, particularly anodized aluminum or an anodized aluminum alloy. Alternatively, it is also possible that the metal cover plate is made of brass or a brass alloy. If the metal cover is made of brass or a brass alloy, it is preferably chrome-plated, so that a cover, particularly a door molding, is available that is chrome-plated.

A further embodiment of the invention provides that the metal cover comprises a coating, particularly a ceramic coating or a paint coat. This coating may be provided additionally or alternatively to any anodization or chrome-plating.

As mentioned before, the metal cover may be configured as a cover strip, which preferably extends across the width of the door and is disposed on the outer edge zone of the door visibly from the outside. The lower edge of the cover—when the door is closed—abuts the door sill of the motor vehicle associated with the body.

The adhesive connection preferably comprises at least one adhesive tape. A double-sided adhesive tape enables secure fastening of the metal cover to the inner cover part. In particular, the forces required for carrying the weight of the metal cover are absorbed by the bracing or locking of the metal cover on the cover part, so that such forces do not have to be absorbed by the adhesive tape or only to a certain extent.

The adhesive connection preferably comprises an adhesive molded part. This is an "interposed" part, which is disposed between the metal cover and the inner cover part and in particular creates shape-adapted surfaces in order to achieve one or more adhesive connections with good adhesion.

A further embodiment of the invention provides that the adhesive component is disposed between an exterior surface of the cover part and an interior surface of the metal cover and is glued both to the cover part and to the metal cover.

Furthermore, it is advantageous if the adhesive molded part, in addition or alternatively to the bonded joint, is screwed and/or riveted to the cover part and/or carrier part.

One further development of the invention provides that the carrier part forms a base part and the cover part forms a mounting part. It is preferable if the base part and the mounting part are held together detachably by means of at least one detent connection. During installation of the cover it is therefore only required to attach the base part to the supporting structure of the exterior motor vehicle part, particularly the motor vehicle door, and then snap the cover part provided with the metal cover or the mounting part onto the base part. Alternatively, it is also possible that the mounting part is snapped onto the base part first and then the metal cover plate is attached to the cover part.

It is particularly advantageous if the cover part is a visible part if the metal cover is not used due to the vehicle series design. This demonstrates the underlying basic idea of the invention, namely to use a cover part that per se is used for a "regular" series as a retaining part in order to fasten the metal cover thereon—insofar as, for example, a certain design is supposed to be achieved—so that the cover part now is no longer visible, but only performs the supporting function. The design is rather determined by the metal cover.

According to a further development of the invention, it is provided that the visible part or cover part comprises contact zones or retaining zones for the metal cover, the zones being formed by material removal. The visible part is the mounting part, which is not visible when a cover plate is used and to which the metal cover is attached. So as to prevent increased outside contours of the cover as a result of mounting the metal cover, the mounting part is machined accordingly by material removal so as to create at least space for the metal thickness/material thickness of the metal cover/cover element.

A further development of the invention provides that the metal cover comprises a downward bend or lateral bend for the bracing or locking.

The invention further relates to a method for producing a cover, particularly according to the above descriptions, for an exterior motor vehicle part, particularly a motor vehicle door, comprising at least one carrier part and one cover part, wherein a metal cover is disposed over the cover part.

It is preferable if the metal cover is disposed on the cover part by bracing or locking and is glued thereto.

In particular, the bracing or locking is provided on an upper edge of the cover part; the gluing is preferably performed in the lower region of the cover part.

In particular, it is provided that the cover part forms a visible part if a metal cover is not used due to the vehicle series design. This visible part (if a metal cover is not used) or hidden cover part (if a metal cover is used) is machined by material removal, when using a metal cover, such that at least the metal thickness of the metal cover can be received in at least one edge region without increasing the outside contour dimensions.

The invention further relates to the use of a visible part of an exterior motor vehicle part, particularly a motor vehicle door, as a hidden retaining part of a cover comprising a cover element, particularly a metal cover.

The drawings illustrate the invention by way of exemplary embodiments, wherein.

Figure 1:
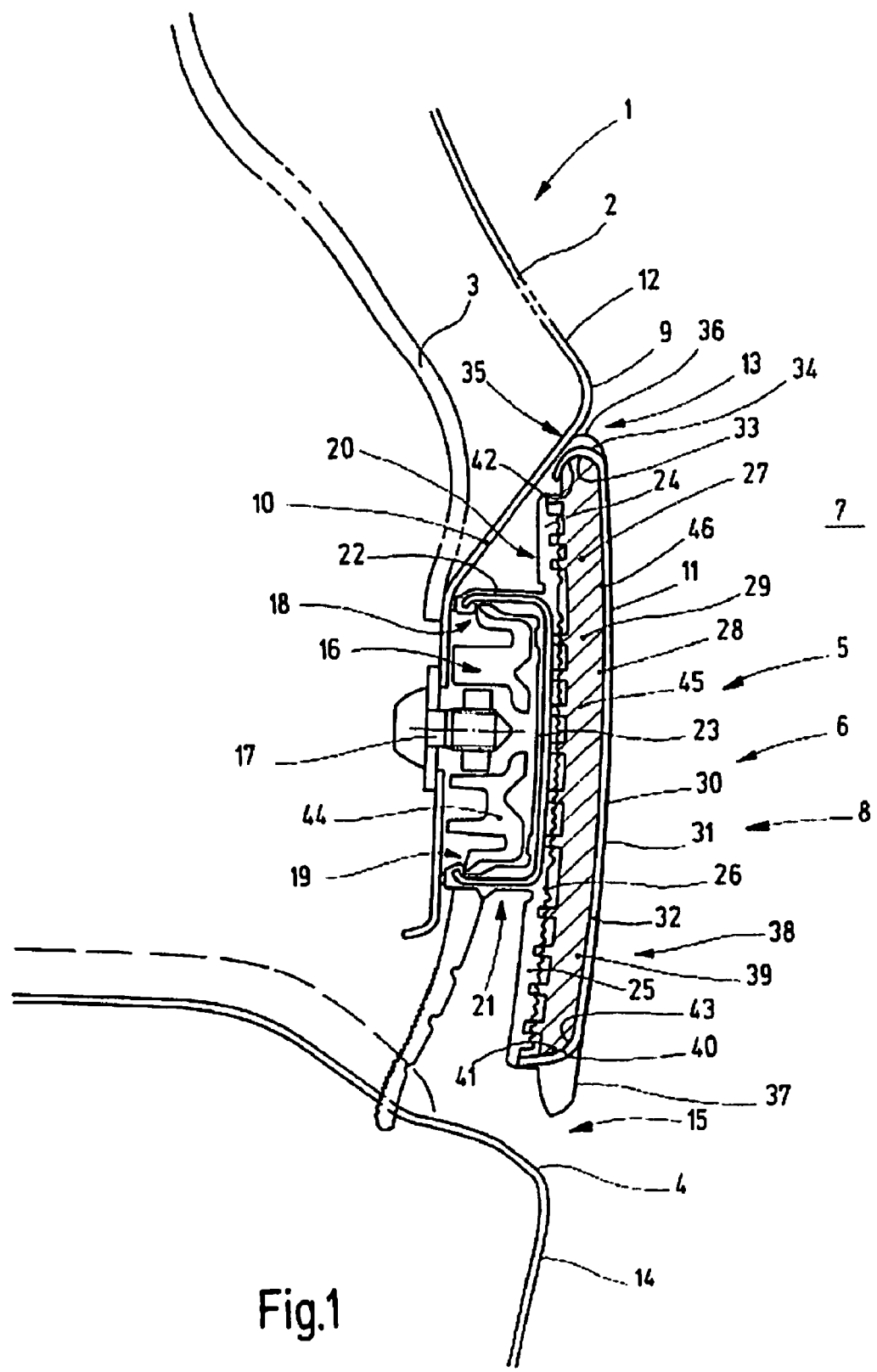
FIG. 1 is a cross-section of a cover provided on a motor vehicle door.
Figure 1A:
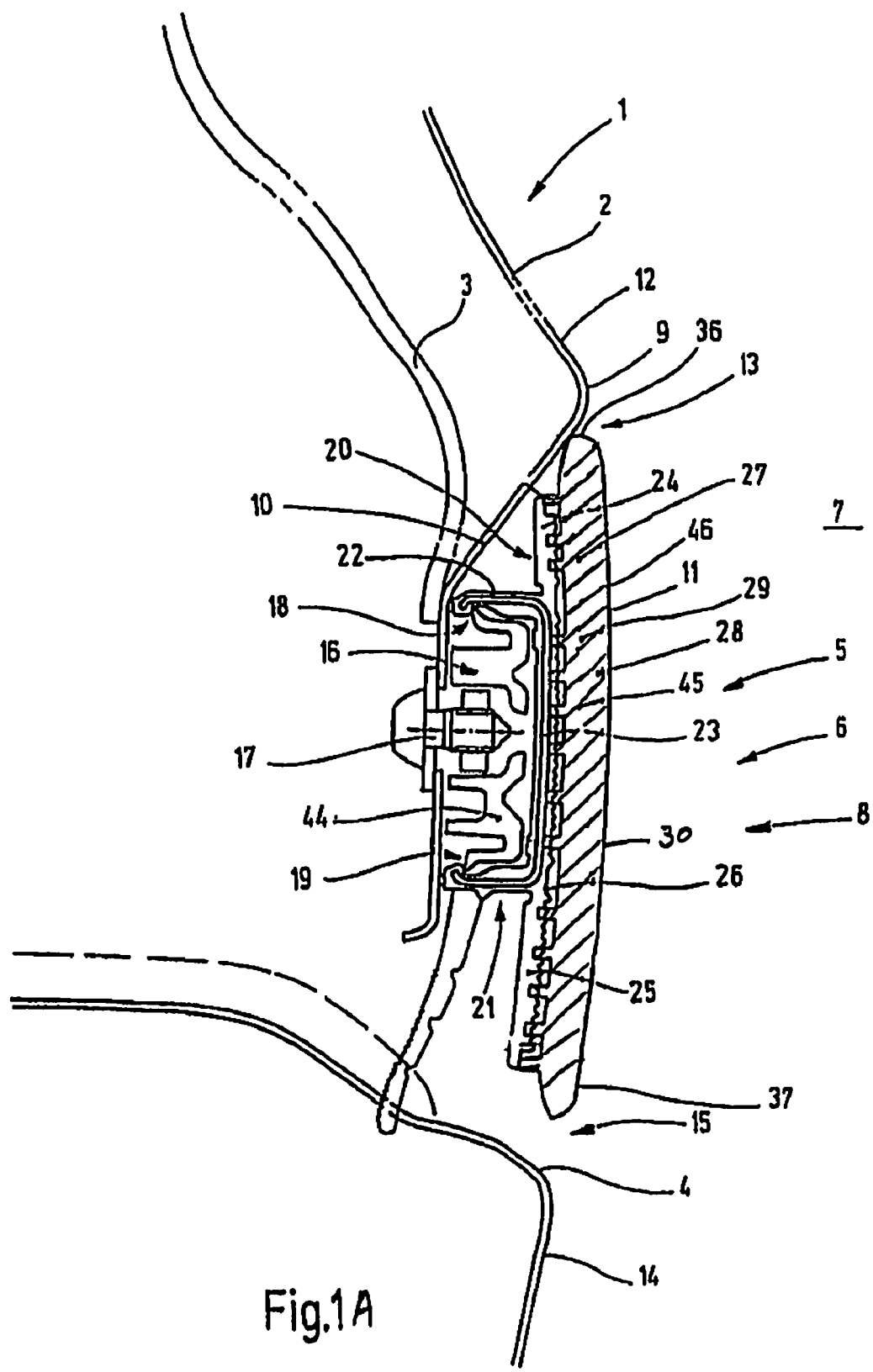
FIG. 1A is a cross-section similar to FIG. 1, illustrating the cover element removed.

FIG. 1 shows the lower region of a motor vehicle door 1, which comprises an outer panel 2 as well as an inner carrier structure 3 or the like. The motor vehicle door 1 is in the closed state, so that it is located in the direct vicinity of the associated, indicated door sill 4. In the lower edge region 5 of the motor vehicle door 1, a cover 6 is provided, which—when viewing the associated vehicle from the outside (reference numeral 7)—is visible and extends in a strip shape across the width of the motor vehicle door 1. In this respect, the cover 6 forms a cover strip 8. In the region of the cover 6, the outer panel 2 of the motor vehicle door 1 due to the arc-shaped course (arc 9) comprises a retracted, strip-shaped zone 10, in which the cover 6 is disposed, wherein—according to FIG. 1—the outside 11 of the cover 6 connects in an aligned fashion to the outside 12 of the outer panel 2 visible from the outside while forming a strip-shaped depression 13 and also assumes a substantially aligned position with the outside 14 of the door sill 4 associated with the body of the motor vehicle while forming a gap 15.

The cover 6 is configured as follows: It comprises a carrier part 16, which is attached to the outer panel 2 in the region of the retracted zone 10 by means of fastening elements 17. A cover part 20 is connected to the carrier part 16 in a snap-fit manner by means of two detent connections 18, 19. The cover part 20 comprises a section 21 having a U-shaped profile 22, which—in the snap-fit state—braces the carrier part 16, which is preferably configured strip-shaped and extends across the door width, and is detachably held in this position by means of the detent connections 18 and 19. A center cross-member 23 of the U-shaped profile 22 continues on both sides from the latter with retaining strips 24 and 25—and protrudes beyond the U-shaped profile 22—so that the center cross-member 23 in conjunction with the retaining strips 24 and 25 forms a retainer 26 for an areal cover element 27 of the cover part 20, which—from a cross-sectional view—has a slightly convexly shaped outside surface 28. In certain vehicle types, the outside surface 28, which is painted in the vehicle color, forms a visible exterior surface, which is to say the cover part 20 forms a visible part 29 under the above conditions.

If a design variation is desired, the procedure according to the invention is as follows: The cover part 20 is associated with a cover element 30 overlaying the same. The cover element 30 is preferably configured as a metal cover 31. The metal cover 31, which is configured as an anodized aluminum sheet 32, overlays an edge region 33 of the cover part 20 comprising a curved region 34, resulting in a locking configuration 35 in this location. So as to create space for the metal thickness of the metal cover 31 in the region of the strip-shaped depression 13 to the outer panel 2, the cover part 20 is machined by material removal. The original configuration of the cover part 20 is marked by the lines denoted with reference numerals 36 and 37, which is to say that the cover part 20 is made smaller with respect to its height, so that the metal cover 31 has room. While in the upper region 47 the metal cover 31 is held against the cover part 20 by means of the afore-mentioned locking configuration 35, it is held by at least one adhesive connection 39 especially in the lower region 38. Also in the lower region 38, the metal cover 31 comprises a lateral bend 40, which overlays the lower edge 41 of the cover part 20, however no locking configuration exists here.

The cover part 20 and retainer 26 are connected to one another particularly by means of friction welding. The carrier part 16, U-shaped profile 22, retaining strips 24 and 25 as well as the cover part 20 are preferably made of plastic, wherein for the visible part 29, meaning the areal cover element 27, premium plastic material is used in order to create a smooth outside surface 28, which is painted—if no metal cover 31 is used. If, however, a metal cover 31 is used in order to create a special design, it is not necessary to paint the outside surface 28. Rather the unpainted part is used, which is then provided with the metal cover 31 in that it is attached in the locking configuration 35 and to the cover part 20 by means of the adhesive connection 39. In the lower region 38—according to line 37—it is indicated that also here the cover part 20 was machined by material removal in order to create a new contour, which is overlaid by the metal cover 31. The material removal is preferably achieved by milling. This creates contact zones 42 and 43 for the metal cover 31.

During the installation, first the carrier part 16 is attached to the motor vehicle door 1. The carrier part 16 thus forms a base part 44. Thereafter, the cover part 20 provided with the metal cover 31 is snap-fit onto the base part 44 by means of the U-shaped profile 22, so that the base part 44 is detachably connected to a mounting part 45.

Figure 2:
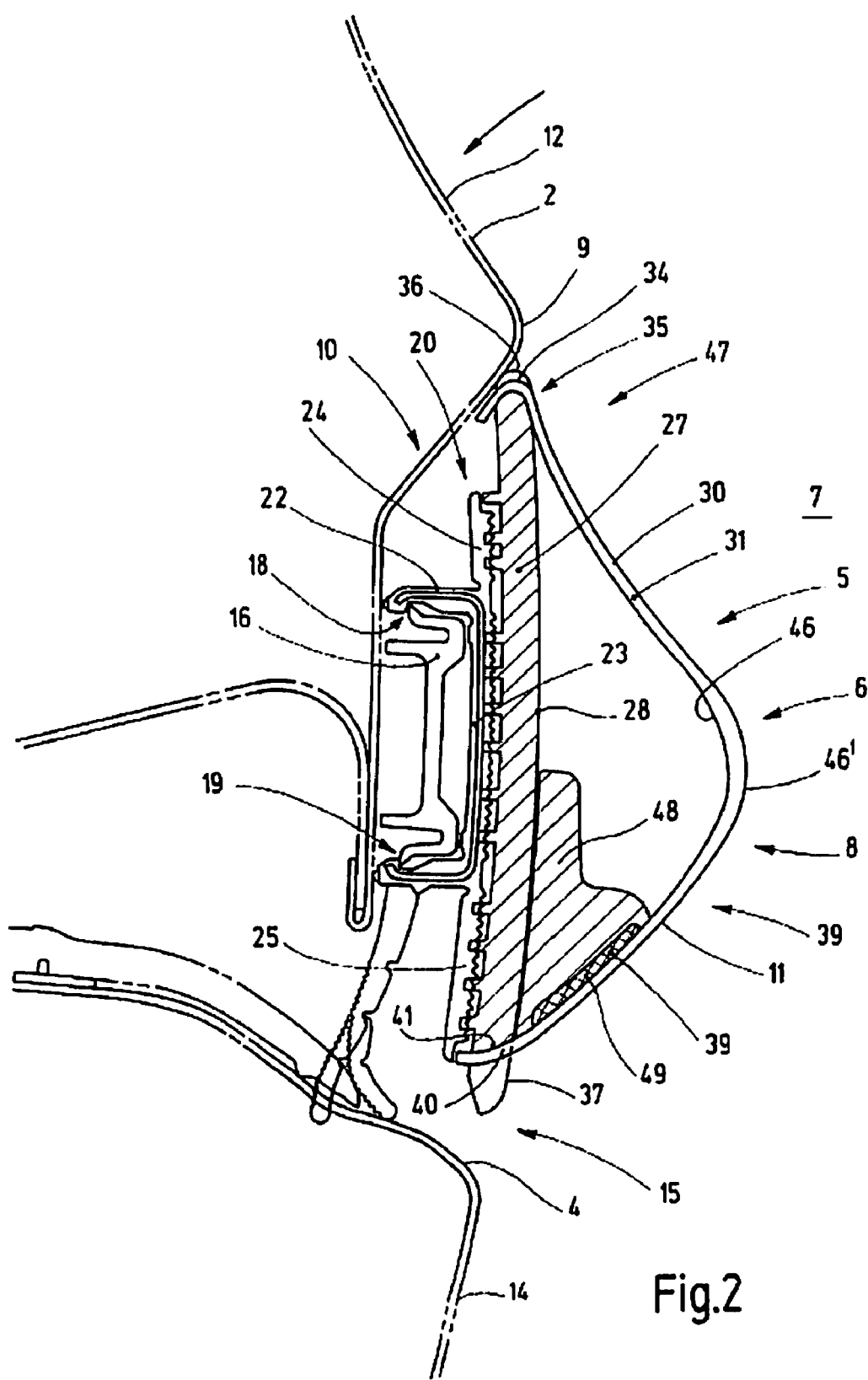
FIG. 2 is a further exemplary embodiment of a cover.

FIG. 2 illustrates a further exemplary embodiment of a cover 6, which differs from the exemplary embodiment according to FIG. 1 only in that the outside surface 28 of the cover part 20 is not areally disposed on the inside 46 of the metal cover 31, but that the metal cover 31—in a cross-sectional view—has an arc-shaped structure so that a bead 46' is formed, achieving a special design effect. To fasten the metal cover 31 to the cover part 20, in the upper region 47 the locking configuration 35 already mentioned in the exemplary embodiment according to FIG. 1 is created. In the lower region 38, between the outside surface 28 of the cover part 20 and the inside 46 of the metal cover 31, an adhesive molded part 48 configured as a formed part, particularly a molded strip, is disposed, which is attached to the outside surface 28 of the cover part 20 and is furthermore glued to the inside 46 of the metal cover 31 by means of an adhesive connection 39. The adhesive connection 39 is provided by a double-sided adhesive tape 49. The connection between the adhesive molded part 48 and the cover part 20 can likewise be configured as an adhesive connection 39.

Furthermore, it should be noted that the cross-sectional structure of the metal cover 31 does not have to remain the same across the width of the motor vehicle door 1, but that over the course of the door width the bead 46' can increase or decrease, so that overall a corresponding profile is produced.

Figure 3:
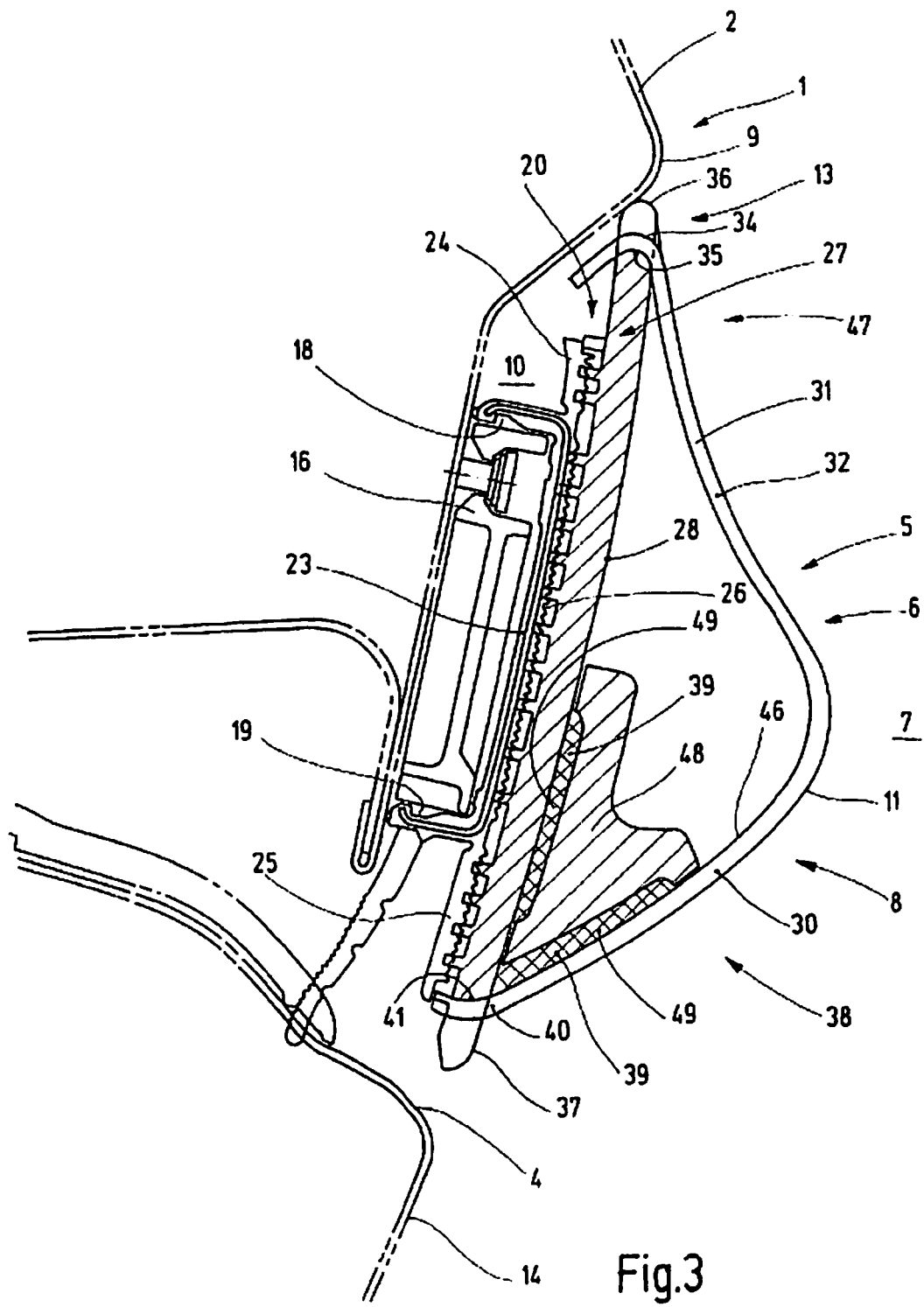
FIG. 3 is a further exemplary embodiment of a cover.

The exemplary embodiment according to FIG. 3 differs from the exemplary embodiment according to FIGS. 1 and 2 only in that the carrier part 16 is configured differently, wherein however the detent connection between the carrier part 16 and the U-shaped profile 22 of the cover part 20 remains. As is apparent, the adhesive molded part 48 in the exemplary embodiment according to FIG. 3 is provided with two double-sided adhesive tapes 49, as a result of which on the one hand the part is fastened to the outside surface 28 of the cover part 20 and on the other hand it is connected to the inside 46 of the metal cover 31.

Figure 4:
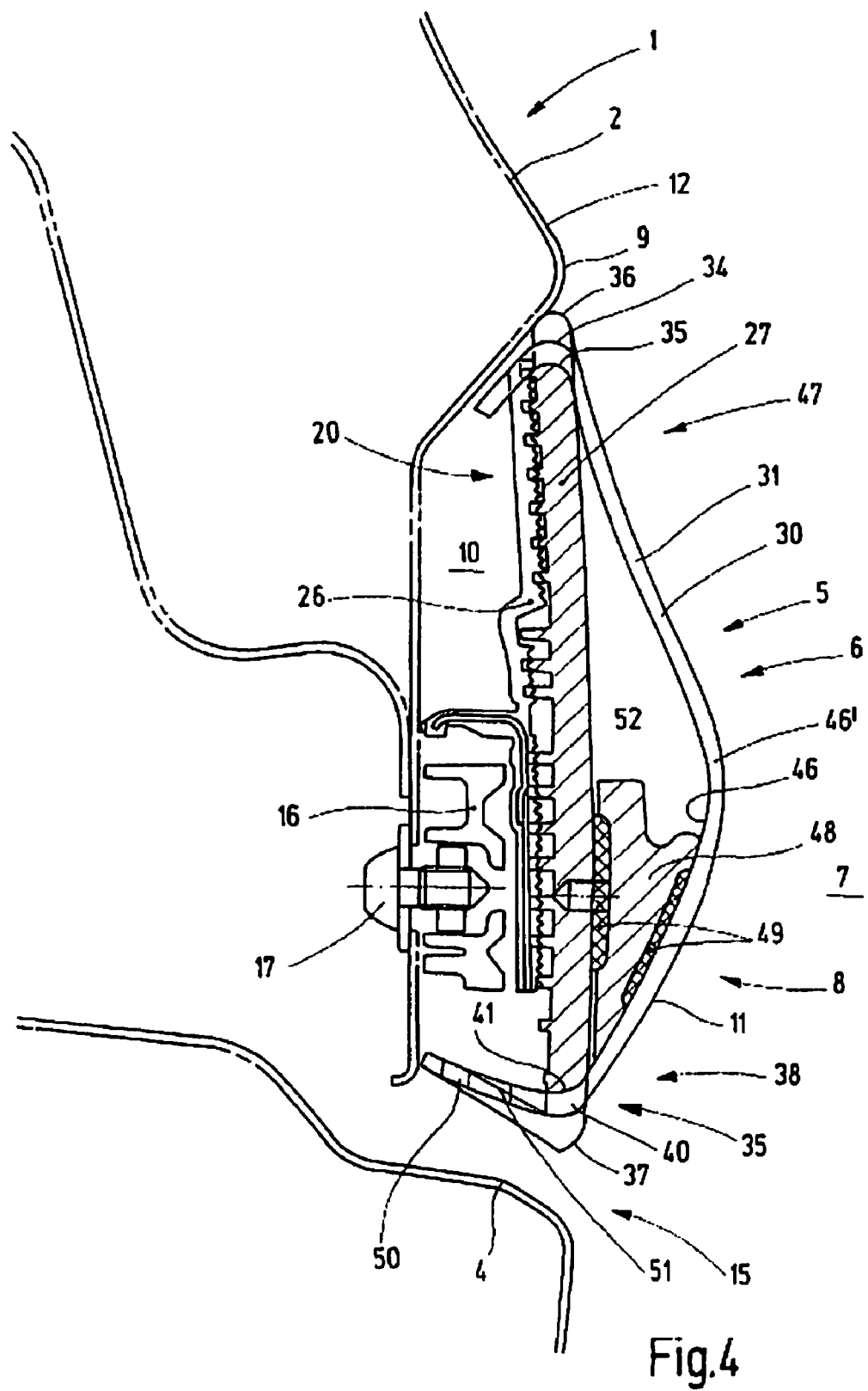
FIG. 4 is a last exemplary embodiment of a cover.

The embodiment according to FIG. 4 differs from the preceding exemplary embodiments according to FIGS. 2 and 3 in that the bead 46' is not configured as pronounced and that the lateral bend 40 is such that also in the lower region 38 a locking configuration 35 to the cover part 20 is achieved, wherein the leg 50 of the metal cover 31 formed by the lateral bend 40 has a substantially closed structure, which is provided with at least one water drain 51. The adhesive molded part 48 in turn comprises two adhesive tapes 49 in order to create the connection to the cover part 20 on the one hand and the connection to the metal cover 31 in the lower region 38 on the other hand, wherein in addition to the corresponding adhesive tape 49 fastening elements that are hidden from the outside are provided in order to attach the adhesive molded part 48 to the cover part 20.

The invention claimed is:

1. A cover assembly for attachment to an exterior panel of a motor vehicle, the cover assembly comprising:
   a base member for attachment to the exterior panel of the motor vehicle;
   an intermediate element including a first portion and a second portion, the first portion secured to the base member;
   a first cover element carried by the second portion of the intermediate element, the first cover element for completely obscuring the base member and the intermediate element when the cover assembly is viewed from an exterior of the motor vehicle; and
   a second cover element selectively attachable to the first cover element for overlying the first cover element and thereby altering the exterior appearance of the cover assembly.

2. The cover according to claim 1, wherein the second cover element is a thin metal cover element.

3. The cover according to claim 2, wherein the thin metal cover element generally conforms in shape to an exterior shape of the first cover element.

4. The cover according to claim 1, wherein the first cover element and the second cover element are cooperatively configured for direct attachment to one another.

5. The cover according to claim 1, wherein the second cover element completely conceals the first cover element.

6. The cover according to claim 1, wherein the first cover element is a visible part of the exterior panel of the motor vehicle when the second cover element is not attached to the first cover element and the first cover element is a hidden retaining element when the second cover element is attached to and overlying the first cover element.

7. The cover according to claim 1, wherein the second cover element is a deep-drawn part.

8. The cover according to claim 2, wherein the thin metal cover element is made of a material selected from a group including anodized aluminum, anodized aluminum alloy, and combinations thereof.

9. The cover according to claim 2, wherein the thin metal cover element is made of a material selected from a group including brass, brass alloy, and combinations thereof.

10. The cover according to claim 2, wherein the thin metal cover element is chrome-plated.

11. The cover according to claim 2, wherein the thin metal cover element includes a coating selected from a group including a ceramic coating, a paint coating, and combinations thereof.

12. The cover according to claim 2, wherein the thin metal cover element is configured as a cover strip.

13. The cover according to claim 1, wherein the base member and the intermediate element are detachably attached to one another by at least one detent connection.

14. The cover according to claim 1, wherein the first cover element includes a painted surface visible when the second cover element is not used.

* * * * *